United States Patent
Kang et al.

(10) Patent No.: US 12,104,032 B2
(45) Date of Patent: Oct. 1, 2024

(54) COATING COMPOSITION, DISPLAY DEVICE INCLUDING COATING LAYER, AND MANUFACTURING METHOD OF DISPLAY DEVICE

(71) Applicants: Samsung Display Co., LTD., Yongin-si (KR); NIC LAB Co., LTD., Ansan-si (KR)

(72) Inventors: Su-Hyoung Kang, Seoul (KR); Min Hyuck Kang, Seoul (KR); Yun Ho Kim, Ansan-si (KR); Jae Sung Kim, Ansan-si (KR); Jeong Eun Kim, Hwaseong-si (KR)

(73) Assignees: SAMSUNG DISPLAY CO., LTD., Gyeonggi-do (KR); NIC LAB CO., LTD., Ansan-si (KR)

( * ) Notice: Subject to any disclaimer, the term of this patent is extended or adjusted under 35 U.S.C. 154(b) by 0 days.

(21) Appl. No.: 17/533,016

(22) Filed: Nov. 22, 2021

(65) Prior Publication Data
US 2022/0282051 A1    Sep. 8, 2022

(30) Foreign Application Priority Data
Mar. 3, 2021    (KR) ........................ 10-2021-0028296

(51) Int. Cl.
*C08J 7/046*    (2020.01)
*C09D 7/40*    (2018.01)
(Continued)

(52) U.S. Cl.
CPC ................ *C08J 7/046* (2020.01); *C09D 7/63* (2018.01); *C09D 7/65* (2018.01); *C09D 7/67* (2018.01);
(Continued)

(58) Field of Classification Search
CPC .............. C08J 7/046; G02B 1/14; C09D 7/65; C09D 7/67; C09D 7/63; C09D 127/12; C09D 183/00; B82Y 40/00
See application file for complete search history.

(56) References Cited

U.S. PATENT DOCUMENTS

| | | |
|---|---|---|
| 5,296,547 A | 3/1994 | Nestegard et al. |
| 5,393,787 A | 2/1995 | Nestegard et al. |

(Continued)

FOREIGN PATENT DOCUMENTS

| | | |
|---|---|---|
| JP | 2500824 A | 2/1993 |
| JP | 4110319 A | 1/2004 |

(Continued)

OTHER PUBLICATIONS

Ahn, Yong Nam, et al. "Adsorption Characteristics of Silane-Functionalized Perfluoropolyether on Hydroxylated Glassy Silica Surfaces: A Multiscale Approach." Applied Surface Science, vol. 496, 2019, p. 143699.

*Primary Examiner* — Robert S Walters, Jr.
(74) *Attorney, Agent, or Firm* — CANTOR COLBURN LLP

(57) ABSTRACT

A coating composition includes a compound of Chemical Formula 1:

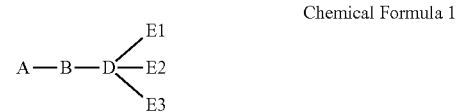

Chemical Formula 1 wherein the groups are described herein.

5 Claims, 10 Drawing Sheets

(51) Int. Cl.
*C09D 7/63* (2018.01)
*C09D 7/65* (2018.01)
*C09D 127/12* (2006.01)
*C09D 183/00* (2006.01)
*G02B 1/14* (2015.01)
*B82Y 40/00* (2011.01)

(52) U.S. Cl.
CPC ......... *C09D 127/12* (2013.01); *C09D 183/00* (2013.01); *G02B 1/14* (2015.01); *B82Y 40/00* (2013.01)

(56) References Cited

U.S. PATENT DOCUMENTS

| | | | |
|---|---|---|---|
| 6,784,312 | B2 | 8/2004 | Miyazawa et al. |
| 7,294,731 | B1 * | 11/2007 | Flynn .................. C07F 7/1804 556/427 |
| 7,671,112 | B2 * | 3/2010 | Hintzer .................. C08L 27/12 524/544 |
| 2014/0113083 | A1 * | 4/2014 | Lee ......................... G02B 1/11 204/192.1 |
| 2020/0117029 | A1 | 4/2020 | Sung |

FOREIGN PATENT DOCUMENTS

| | | |
|---|---|---|
| JP | 4083399 B2 | 4/2008 |
| JP | 5448407 | 3/2014 |
| KR | 960700283 A | 1/1996 |
| KR | 20200040953 A | 4/2020 |
| WO | 2019005272 A1 | 1/2019 |

\* cited by examiner

COATING COMPOSITION, DISPLAY DEVICE INCLUDING COATING LAYER, AND MANUFACTURING METHOD OF DISPLAY DEVICE

CROSS-REFERENCE TO RELATED APPLICATION

This application claims priority from and the benefit of Korean Patent Application No. 10-2021-0028296, filed on Mar. 3, 2021, which is hereby incorporated by reference for all purposes as if fully set forth herein.

BACKGROUND

Field

Embodiments of the invention relate generally to coating compositions, display devices including a coating layer, and manufacturing methods for display devices, display devices, and more particularly to coating compositions having an anti-fingerprint characteristic, and display devices including a coating layer manufactured with the coating composition.

Discussion of the Background

Recently, a flexible display device having flexibility that may fold and unfold instead of a glass substrate or a high-hardness substrate with a film in a display device has been developed. The flexible display device is thin, light, strong against impact, and may be folded and unfolded, so that it may be manufactured in various forms. In the flexible display device, not only a substrate but also various elements included in the flexible display device must have flexibility. A window film thereof should also have excellent hardness and flexibility.

Plastic is used as the window film, and it is widely applied as a glass replacement material due to its light weight, strong impact characteristics, and transparent characteristics. Such a window film requires characteristics such as weather resistance, scratch resistance to withstand scratches from external stimuli, impact resistance to external impacts, and workability.

The above information disclosed in this Background section is only for understanding of the background of the inventive concepts, and, therefore, it may contain information that does not constitute prior art.

SUMMARY

Coating compositions and display devices including a coating layer made according to the principles and illustrative implementations of the invention have improved anti-fingerprint characteristics and wear resistance. Methods of manufacturing display devices according to the principles and illustrative implementations of the invention can reduce peeling of a coating layer.

Additional features of the inventive concepts will be set forth in the description which follows, and in part will be apparent from the description, or may be learned by practice of the inventive concepts.

According to one aspect of the invention, a coating composition includes a compound of Chemical Formula 1:

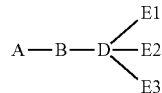

Chemical Formula 1 wherein the groups are described herein.

The coating composition may include compounds of Chemical Formula 1 having different molecular weights of the group A.

The coating composition may include: a first compound with a molecular weight of the group A of about 270 to about 930 in Chemical Formula 1, a second compound with a molecular weight of the group A of about 1,800 to about 2,200 in Chemical Formula 1, and a third compound with a molecular weight of the group A of about 3,600 to about 4,400 in Chemical Formula 1.

The weight ratios of the first, second, and third compounds of the coating composition may be: the first compound to the second compound is about 0.9:1 to about 1.1:1; the second compound to the third compound is about 0.9:1 to about 1.1:1; and the third compound to the first compound is about 0.9:1 to about 1.1:1.

The group A may be a perfluoropolyether group with a molecular weight of about 270 to about 4400.

The group A may be a group of Chemical Formula 2, as described herein.

The group A may include a group of Chemical Formula 3, as described herein.

Each of $X_2$ and $X_3$ may be a group, independently from one another, of Chemical Formula 4 or Chemical Formula 5, as described herein.

A compound of Chemical Formula 1 may be a compound of Chemical Formula 6, as described herein.

According to another aspect of the invention, a display device includes: a first layer; and a second layer disposed on the first layer, wherein the second layer includes a compound of Chemical Formula 1:

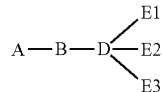

Chemical Formula 1 wherein the groups are described herein.

The second layer may include an anti-fingerprint layer having compounds of Chemical Formula 1 having different molecular weights of the group A.

The anti-fingerprint layer may include: a first compound with a molecular weight of the group A of about 270 to about 930 in Chemical Formula 1, a second compound with a molecular weight of the group A of about 1,800 to about 2,200 in Chemical Formula 1, and a third compound with a molecular weight of the group A of about 3,600 to about 4,400 in Chemical Formula 1.

The weight ratios of the first, second, and third compounds of the coating composition may be: the first compound to the second compound is about 0.9:1 to about 1.1:1; the second compound to the third compound is about 0.9:1 to about 1.1:1; and the third compound to the first compound is about 0.9:1 to about 1.1:1.

The group A may be a perfluoropolyether group with a molecular weight of about 270 to about 4,400.

The group A may include a group of Chemical Formula 2 or a group of Chemical Formula 3, as described herein.

The first layer may include a hard coating layer, including: at least one of a urethane, an acryl, an epoxy, a maleimide, or a carboxylic acid, inorganic nanoparticles, and fluorine.

According to another aspect of the invention, a method of manufacturing a display device includes: applying a coating composition to a film; and baking the film with the applied coating composition, wherein the coating composition includes a compound of Chemical Formula 1:

Chemical Formula 1

wherein the groups are described herein.

The film may further include a hard coating layer, and the hard coating layer may include at least one of a urethane, an acryl, an epoxy, a maleimide, and a carboxylic acid, inorganic nanoparticles, and fluorine.

The coating composition may include compounds of Chemical Formula 1 having different molecular weights of the group A.

Each of $X_2$ and $X_3$, independently from one another, may be a hydroxy group, a dimethyl monoalkoxysilane group, a monomethyldialkoxysilane group, a trialkoxysilane group, a silazane group, an amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, or an isocyanate group.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION OF THE EMBODIMENTS

Figure 1:
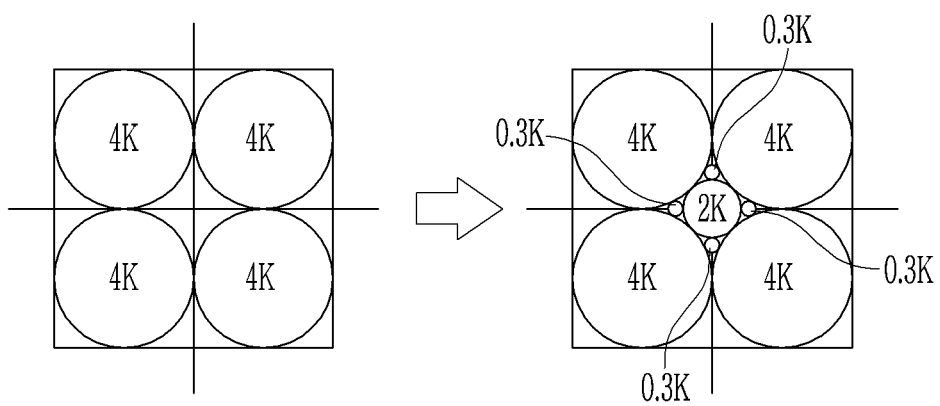
FIG. 1 is a schematic view of an embodiment illustrating a coating composition including a compound having various molecular weights made according to the principles of the invention that has higher wear resistance compared with a coating composition including a compound having one molecular weight.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, substrates, areas, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements, and duplicative explanations are omitted to avoid redundancy.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a coating composition made according to the principles and an embodiment of the invention, a display device including a coating layer coated with such a coating composition, and an illustrative manufacturing method of the coating layer will be described with reference to the accompanying drawings.

A coating composition according to an embodiment includes a compound represented by Chemical Formula 1 below.

Chemical Formula 1

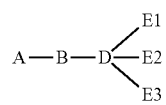

Herein, the group A is an oligomer group containing carbon and fluorine; the group B is $-(CH_2)_x-$, wherein the x is an integer of 0 to 12; the group D is carbon or silicon; each of the groups E1 to E3 is independently selected from H, $-X_1-[(CH_2)_y-X_2]_z$, and $-(CH_2)_y-X_3$, wherein at least one of the groups E1 to E3 is not H; the y is an integer of 0 to 8; the z is an integer of 1 to 3; the $X_1$ is selected from oxygen, nitrogen, sulfur, carbon, and phosphorus; and each of the $X_2$ and $X_3$ independently includes one selected from a hydroxy group, a dimethyl monoalkoxysilane group, a monomethyldialkoxysilane group, a trialkoxysilane group, a silazane group, an amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, an isocyanate group, and a derivative thereof.

In Chemical Formula 1, the group A may be a perfluoropolyether (PFPE) group having a molecular weight of about 270 to about 4400.

In Chemical Formula 1, the group A may be a group represented by Chemical Formula 2 below.

Chemical Formula 2

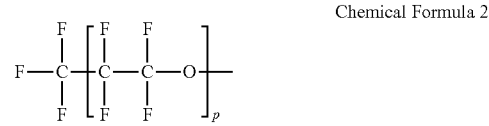

In Chemical Formula 2, the p may be an integer of 2 to 37.

In addition, in Chemical Formula 1, the group A may include a group represented by Chemical Formula 3 below.

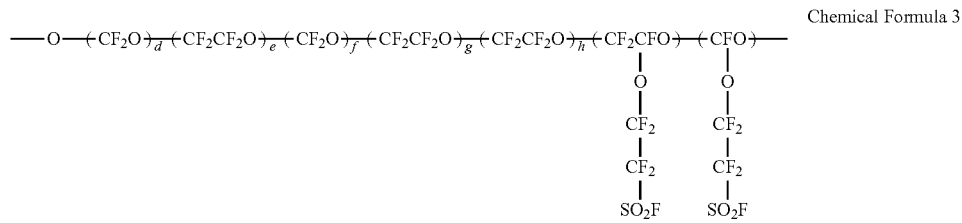

Chemical Formula 3

In Chemical Formula 3, the d, e, f, g, and h may each independently be an integer of 0 to 50.

In Chemical Formula 1, the $X_2$ and $X_3$ may each independently be a group represented by Chemical Formula 4 or Chemical Formula 5.

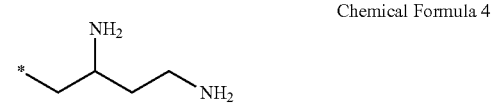

Chemical Formula 4

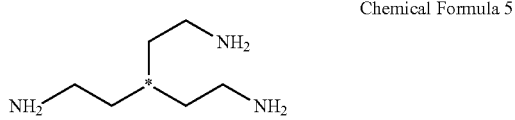

Chemical Formula 5

The * represents a part that is bonded to an adjacent atom.

The coating composition according to the embodiment may be a coating composition for forming an anti-fingerprint coating layer. In this case, in Chemical Formula 1, the group A is a part having an anti-fingerprint characteristic, the E1 to E3 (hereinafter collectively referred to as E) are an anchoring group for attaching to a coating target, and the group B is a linker for connecting the group A and the anchoring group. In this case, when the E includes one or more anchoring groups as in Chemical Formulas 4 and 5, adhesion to the coating target may be strengthened. Particularly, as in Chemical Formulas 4 and 5, adhesion may increase when the E is an amine group.

In the embodiment, the compound represented by Chemical Formula 1 may be a compound represented by Chemical Formula 6.

Chemical Formula 6

Herein, the group a is a perfluoropolyether (PFPE) group with a molecular weight of about 270 to about 4,400; the n1 is an integer of 0 to 12; the n2 is an integer of 1 to 8; the n3 is an integer of 1 to 3; each of the n4 and n5 is independently an integer of 0 to 3 (however, n4+n5=3); the $X_1$ is one of oxygen, nitrogen, sulfur, carbon and phosphorus; and each of the $X_2$ and $X_3$ independently includes one selected from a hydroxy group, a dimethyl monoalkoxysilane group, a monomethyldialkoxysilane group, a trialkoxysilane group, a silazane group, a primary amine group, a secondary amine group, a tertiary amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, an isocyanate group, a hydrogen group, and a derivative thereof.

In Chemical Formula 6, the group A may be a perfluoropolyether (PFPE) group having a molecular weight of about 270 to about 4400. In Chemical Formula 6, the group A may be a group represented by Chemical Formula 2 below.

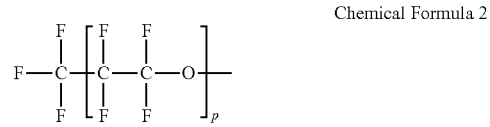

Chemical Formula 2

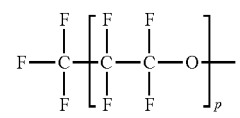

In Chemical Formula 2, the p may be an integer of 2 to 37. In addition, in Chemical Formula 6, the group A may include a group represented by Chemical Formula 3 below.

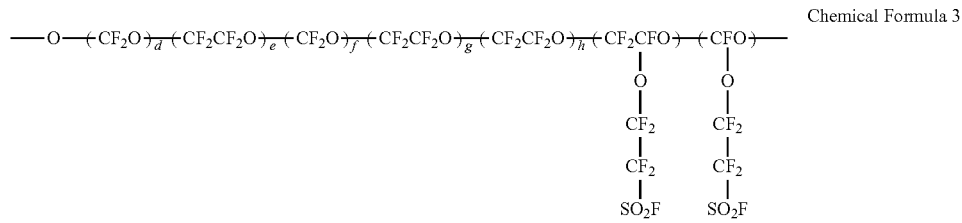

Chemical Formula 3

In Chemical Formula 3, the d, e, f, g, and h may each independently be an integer of 0 to 50. The coating composition made according to embodiments of the invention may include compounds represented by Chemical Formula 1 having different molecular weights.

That is, the coating composition may include a compound a1 with a molecular weight of the A of about 270 to about 930 in Chemical Formula 1, a compound a2 with a molecular weight of the A of about 1,800 to about 2,200 in Chemical Formula 1, and a compound a3 having a molecular weight of the A of about 3,600 to about 4,400 in Chemical Formula 1. Weight ratios of compound a1, compound a2, and compound a3 of the coating composition are: the first compound to the second compound is about 0.9:1 to about 1.1:1; the second compound to the third compound is about 0.9:1 to about 1.1:1; and the third compound to the first compound is about 0.9:1 to about 1.1:1.

In addition, the coating composition may include a compound 6a with a molecular weight of the group a of about 270 to about 930 in Chemical Formula 6, a compound 6b with a molecular weight of the group a of about 1,800 to about 2,200 in Chemical Formula 6, and a compound 6c having a molecular weight of the group a of about 3,600 to about 4,400 in Chemical Formula 6. Weight ratios of compound 6a, compound 6b, and compound 6c of the coating composition are: the first compound to the second compound is about 0.9:1 to about 1.1:1; the second compound to the third compound is about 0.9:1 to about 1.1:1; and the third compound to the first compound is about 0.9:1 to about 1.1:1.

As described above, when the coating composition includes compounds with different molecular weights according to the principles and embodiments of the invention, the wear resistance characteristics of the coating layer using the coating composition may be maximized due to the combination of the compounds with different molecular weights.

FIG. 1 is a schematic view of an embodiment illustrating a coating composition including a compound having various molecular weights made according to the principles of the invention that has higher wear resistance compared with a coating composition including a compound having one molecular weight.

Referring to the left side of FIG. 1, in a case of compounds having only one molecular weight (4000), there is an empty space between them, but as shown in the right side of FIG. 1, when a high molecular weight compound and a low molecular weight compound are mixed (molecular weights 300, 2,000, and 4,000), the low molecular weight (300 and 2,000) compounds may be positioned between the high molecular weight (4,000) compounds. Therefore, it is possible to increase a fluorine density in the coating layer, and to maximize the wear resistance of the coating composition.

Hereinafter, a display device in which the coating composition according to an embodiment is included as a coating layer will be described.

Figure 2:
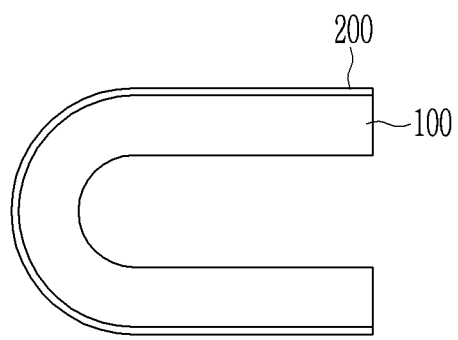
FIG. 2 is a schematic, side view of an embodiment of a display device constructed according to the principles of the invention.

FIG. 2 is a schematic, side view of an embodiment of a display device constructed according to the principles of the invention. Referring to FIG. 2, the display device may include a display panel 100 and a coating layer 200 disposed on the display panel 100. As shown in FIG. 2, the display device may be a foldable display device.

Figure 3:
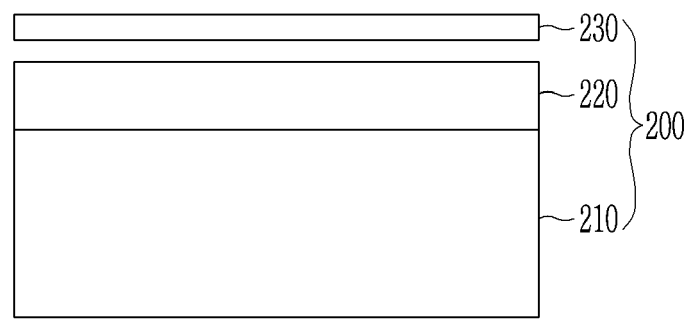
FIG. 3 is a schematic, elevational view of a coating layer of a display device constructed according to the principles of the invention.

FIG. 3 is a schematic, elevational view of a coating layer of a display device constructed according to the principles of the invention. Referring to FIG. 3, the coating layer 200 includes a base film 210, a first layer or a coating layer in the form of a hard coating layer 220, and a second layer in the form of an anti-fingerprint layer 230. In this case, the anti-fingerprint layer 230 may be manufactured with the above-described coating composition, and may include the compounds of Chemical Formula 1 having different molecular weights. The base film 210 may include a polyether block amide film. In this case, a modulus of the base film may be about 700 MPa to about 750 MPa. The thickness of the base film 210 may be about 90 μm to about 110 μm.

The hard coating layer 220 may include an anti-fingerprint characteristic. The hard coating layer 220 may include at least one of a urethane, an acryl, an epoxy, a maleimide, and a carboxylic acid, and may include inorganic nano-particles. The inorganic nano-particle may be one or more of a silica, antimony (Sb), and a platinum oxide (PtO). The hard coating layer 220 may include fluorine, and particularly, a surface thereof contacting the anti-fingerprint layer 230 may include fluorine. Because of the fluorine included in the hard coating layer 220 as described above, the hard coating layer 220 may have an anti-fingerprint characteristic. In order to increase reactivity of the hard coating layer 220, the hard coating layer 220 may be heat-treated or UV-irradiated. In this case, adherence with the anti-fingerprint layer 230 formed afterwards is improved.

The anti-fingerprint layer 230 may include a compound represented by Chemical Formula 1 below.

Chemical Formula 1

Herein, the A group is an oligomer group containing carbon and fluorine; the B is $-(CH_2)_x-$, wherein the x is an integer of 0 to 12; the D is carbon or silicon; each of the E1 to E3 is independently selected from H, $-X_1-[(CH_2)_y-X_2]_z$, and $-(CH_2)_y-X_3$, wherein at least one of the E1 to E3 is not H; they is an integer of 0 to 8; the z is an integer of 1 to 3; the $X_1$ is selected from oxygen, nitrogen, sulfur, carbon, and phosphorus; and each of the $X_2$ and $X_3$ independently includes one selected from a hydroxy group, a dimethyl monoalkoxysilane group, a monomethyldialkoxysilane group, a trialkoxysilane group, a silazane group, an amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, an isocyanate group, and a derivative thereof.

In Chemical Formula 1, the A may be a perfluoropolyether (PFPE) group having a molecular weight of about 270 to about 4,400. In Chemical Formula 1, the A may be a group represented by Chemical Formula 2 below.

Chemical Formula 2

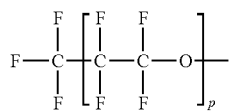

The p is an integer of 2 to 37. In Chemical Formula 1, the A may include a group represented by Chemical Formula 3 below.

Chemical Formula 3

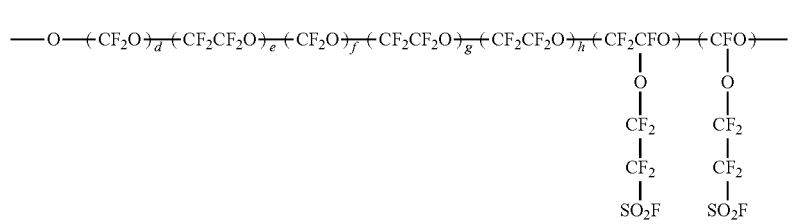

In Chemical Formula 3, each of the d, e, f, g, and h may independently be an integer of 0 to 50. In Chemical Formula 1, each of the $X_2$ and $X_3$ may independently be a group represented by Chemical Formula 4 or Chemical Formula 5.

Chemical Formula 4

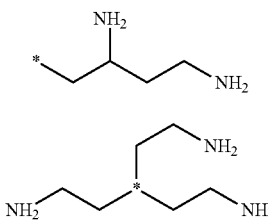

Chemical Formula 5

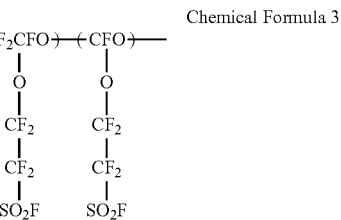

The * represents a part that is bonded to an adjacent atom. The compound represented by Chemical Formula 1 may be a compound represented by Chemical Formula 6.

Chemical Formula 6

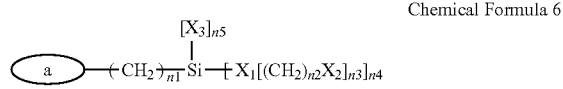

Herein, the group a is a perfluoropolyether (PFPE) group with a molecular weight of about 270 to about 4,400; the n1 is an integer of 0 to 12; the n2 is an integer of 1 to 8; the n3 is an integer of 1 to 3; each of the n4 and n5 is independently an integer of 0 to 3 (however, n4+n5=3); the $X_1$ is one of oxygen, nitrogen, sulfur, carbon and phosphorus; and each of the $X_2$ and $X_3$ independently includes one selected from a hydroxy group, a dimethyl monoalkoxysilane group, a monomethyldialkoxysilane group, a trialkoxysilane group, a silazane group, a primary amine group, a secondary amine group, a tertiary amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, an isocyanate group, a hydrogen group, and a derivative thereof.

The anti-fingerprint layer 230 may include the compounds represented by Chemical Formula 1 having different molecular weights. That is, the anti-fingerprint layer 230 of the display device may include a compound a1 with a molecular weight of the group A of about 270 to about 930 in Chemical Formula 1, a compound a2 with a molecular weight of the group A of about 1,800 to about 2,200 in Chemical Formula 1, and a compound a3 having a molecular weight of the group A of about 3,600 to about 4,400 in Chemical Formula 1. Weight ratios of compound a1, compound a2, and compound a3 of the coating composition are: the first compound to the second compound is about 0.9:1 to about 1.1:1; the second compound to the third compound is about 0.9:1 to about 1.1:1; and the third compound to the first compound is about 0.9:1 to about 1.1:1.

By including the compounds with different molecular weights as described above, it is possible to improve wear resistance, anti-fingerprint characteristics, and chemical resistance. In this way, in the anti-fingerprint layer 230 including the compound represented by Chemical Formula 1, the A of Chemical Formula 1 has an anti-fingerprint characteristic, and the E contacts the hard coating layer 220.

Figure 4:
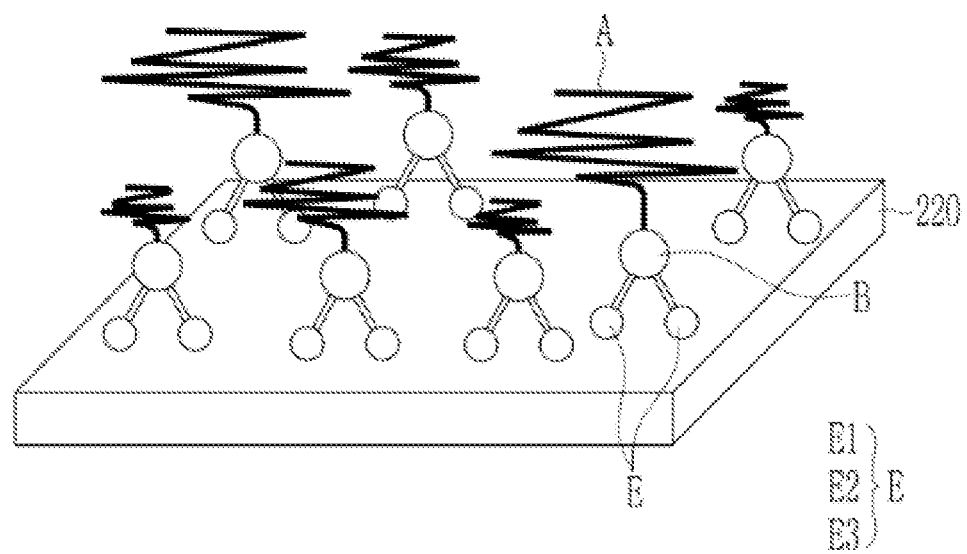
FIG. 4 is a schematic, perspective view of a compound of Chemical Formula 1 made according to the principles of the invention connected to a hard coating layer.

FIG. 4 is a schematic, perspective view of a compound of Chemical Formula 1 made according to the principles of the invention connected to a hard coating layer. Particularly, FIG. 4 schematically illustrates a shape in which the compound of Chemical Formula 1 is connected to the hard coating layer 220. As shown in FIG. 4, an anchoring group such as E is combined with the hard coating layer 220, and has an anti-fingerprint characteristic through the A containing fluorine and carbon.

Figure 5:
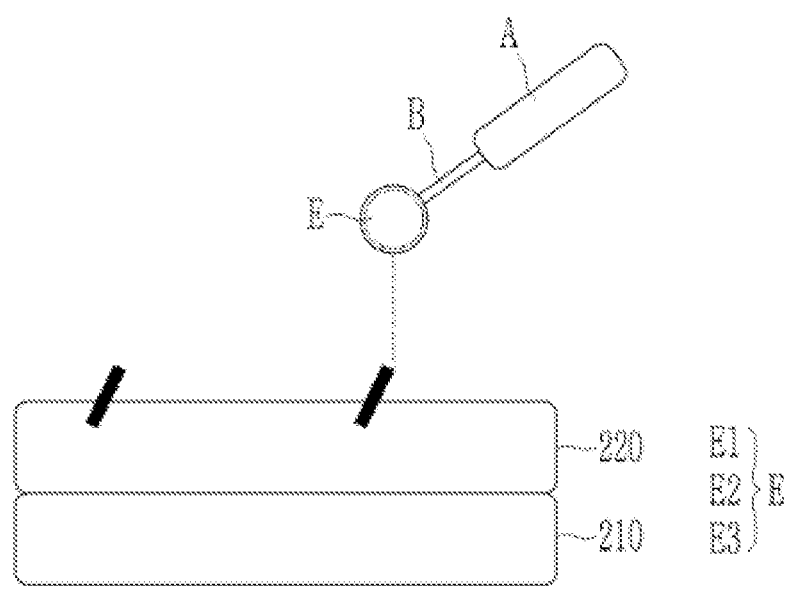
FIG. 5 is a schematic, cross-sectional view of an embodiment of a coating layer made according to the principles of the invention.

FIG. 5 is a schematic, cross-sectional view of an embodiment of a coating layer made according to the principles of the invention. Particularly, FIG. 5 schematically illustrates a cross-section of the coating layer 200. Referring to FIG. 5, the hard coating layer 220 is disposed on the base film 210. The hard coating layer 220 may include a reaction group on a surface thereof. In FIG. 5, the reaction group is indicated by a line. The reaction group of the hard coating layer 220 may be an acryl group or an epoxy group. The anti-fingerprint layer including the compound of Chemical Formula 1 is disposed on the hard coating layer 220. FIG. 5 schematically illustrates the compound of Chemical Formula 1. Among the compounds of Chemical Formula 1, the anchoring group corresponding to the E is chemically bonded to the reaction group of the hard coating layer 220. In FIG. 5, the chemical bond is indicated by a dotted line. The compound of Chemical Formula 1 includes the oligomer group A containing fluorine and carbon, and in Chemical Formula 1, the groups A and E are connected by the group B that is a linker. The anti-fingerprint layer 230 may include the compounds represented by Chemical Formula 1 having different molecular weights.

Figure 6:
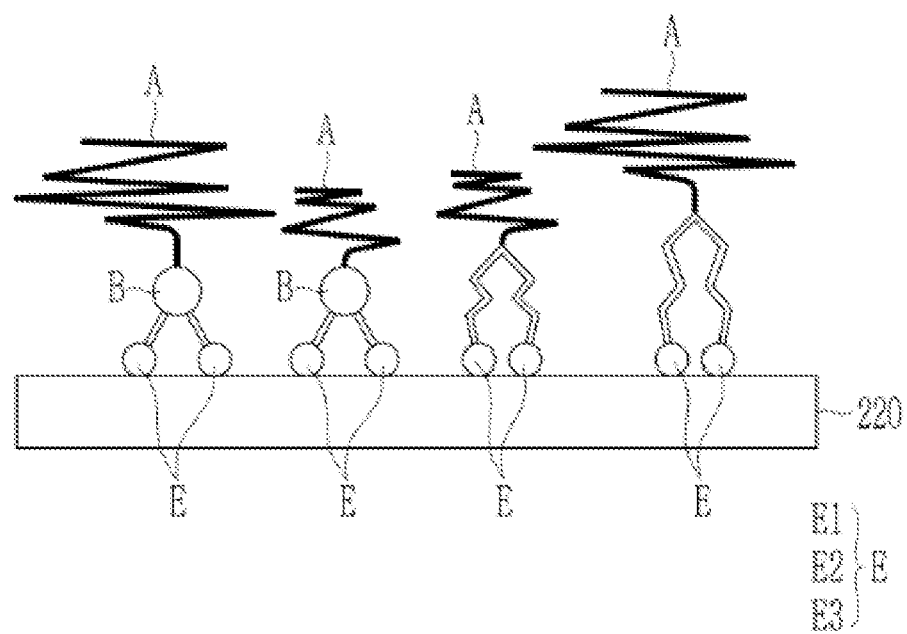
FIG. 6 is a schematic, elevational view of an embodiment of a coating layer including compounds of Chemical Formula 1 having different molecular weights.

FIG. 6 is a schematic, elevational view of an embodiment of a coating layer including compounds of Chemical Formula 1 having different molecular weights. Particularly, FIG. 6 schematically illustrates the coating layer 200 containing the compounds of Chemical Formula 1 having different molecular weights. Referring to FIG. 6, the compound of Chemical Formula 1 having various molecular weights is disposed on the hard coating layer 220. In this case, the difference in molecular weight of respective compounds is due to the difference in length of the A in Chemical Formula 1. As shown in FIG. 6, when the anti-fingerprint layer is formed of the compounds having different molecular weights, the fluorine density of the anti-fingerprint layer may be increased and the anti-fingerprint characteristics may be improved, compared with the case in which only the compound having one molecular weight is provided. In some embodiments, the compound included in the anti-fingerprint layer 230 may have two or three anchoring groups.

Figure 7:
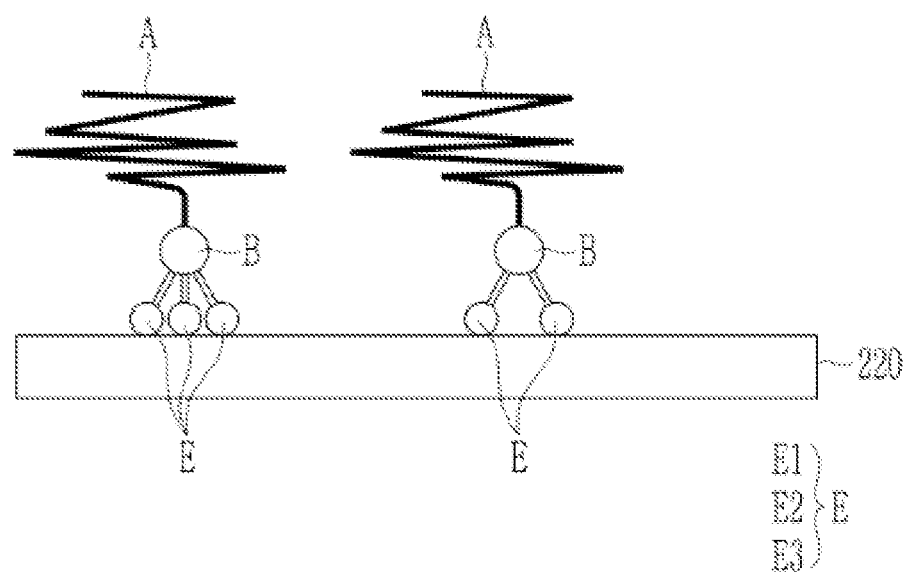
FIG. 7 is a schematic, elevational view of an embodiment of a connection pattern between a compound made according to the principles of the invention included in an anti-fingerprint layer and a hard coating layer.

FIG. 7 is a schematic, elevational view of an embodiment of a connection pattern between a compound made according to the principles of the invention included in an anti-fingerprint layer and a hard coating layer. Particularly, FIG. 7 illustrates a connection pattern between the compound included in the anti-fingerprint layer and the hard coating layer 220. As shown in FIG. 7, when the number of the anchoring groups (E) of the compound is two or three, since an area that is bonded increases, the bonding force between the hard coating layer 220 and the anti-fingerprint layer may increase as compared with the case in which the compound has one anchoring group.

Figure 8:
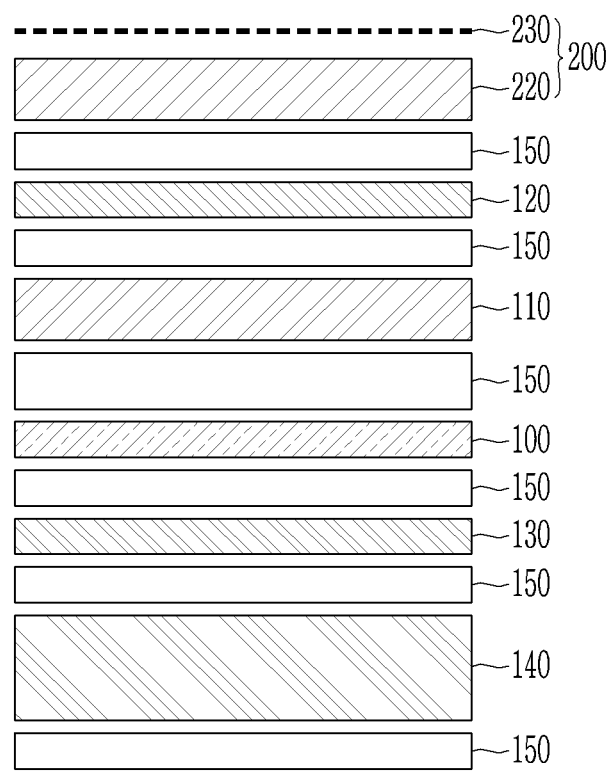
FIG. 8 is a schematic, elevational view showing the stacked structure of an embodiment of a display device constructed according to the principles of the invention.

FIG. 8 is a schematic, elevational view showing the stacked structure of an embodiment of a display device constructed according to the principles of the invention. The structure illustrated in FIG. 8 is only an example, and the embodiments of the invention are not limited thereto.

Referring to FIG. 8, a first film layer 110 and a second film layer 120 may be disposed above the display panel 100, and a rear film layer 130 and a cushion layer 140 may be disposed below the display panel 100. An adhesive layer 150 may be respectively disposed between respective film layers 110 and 120 and the cushion layer 140.

The coating layer 200 is disposed at an uppermost surface of the display device, and includes the hard coating layer 220 and the anti-fingerprint layer 230 disposed on the hard coating layer 220. Descriptions of the hard coating layer 220 and the fingerprint layer 230 are the same as described above. That is, the hard coating layer 220 has an anti-fingerprint function by including a material such as fluorine, and the anti-fingerprint layer 230 includes the compound represented by Chemical Formula 1, and may include the compounds represented by Chemical Formula 1 having different molecular weights. The anti-fingerprint layer 230 of the display device has improved wear resistance by including the compounds having different molecular weights.

Definitions

As used herein, the terms "primary", "secondary", and "tertiary" refer molecular structure of isomeric or chemically similar compounds, such as monohydric alcohols and amines. As an example, a primary alcohol has one alkyl group and two hydrogens, a secondary alcohol has two alkyl groups and one hydrogen, and a tertiary alcohol has three alkyl groups.

As used herein, the terms "a", "A", "B", "E", "E1", "E2", and "E3" may be referred to as, e.g., "group a" or the abbreviation "a".

As used herein, the term "atom" may mean an element or its corresponding radical bonded to one or more other atoms.

The terms "hydrogen" and "deuterium" refer to their respective atoms and corresponding radicals with the deuterium radical abbreviated "-D", and the terms "—F, —Cl, —Br, and —I" are radicals of, respectively, fluorine, chlorine, bromine, and iodine.

Examples

Table 1 shows the results of measuring the wear resistance and chemical resistance with respect to the anti-fingerprint layer (Example 1) containing a compound having a molecular weight of 4,000 and the anti-fingerprint layer (Example 2) containing compounds having a molecular weight of 300, 2,000, and 4,000 in a weight ratio of about 1:1:1, or combined together in substantially equal amounts by weight. In the wear resistance test, the water-repellent angle was measured while increasing the erasing operation from 2,000 times to 9,000 times. The chemical resistance was also measured similarly.

TABLE 1

|  |  | Molecular weight 4000 | Molecular weight combination structure (300 + 2000 + 4000) | |
| --- | --- | --- | --- | --- |
|  |  | Example 1 | Example 2 | Example 3 |
| Wear resistance | Initial angle (°) | 114 | 113 | 113 |
|  | 2000 times | — | 100 | 100 |
|  | 3000 times | 98 | 99 | 103 |
|  | 4000 times | 96 | 99 | 101 |
|  | 5000 times | 87 | 99 | 101 |
|  | 6000 times | — | 97 | 99 |
|  | 7000 times | — | 93 | 95 |
|  | 8000 times | — | 93 | 95 |
|  | 9000 times | — | 87 | 94 |
| Chemical resistance | 1000 times | 97 | 101 | 102 |
|  | 2000 times | 78 | 86 | 102 |
|  | 3000 times | — | — | 94 |

The results summarized in Table 1 show that the abrasion resistance and chemical resistance of Example 2 including all of the compounds having molecular weights of 300, 2000, and 4,000 were excellent, compared with Example 1 including only the compound having a molecular weight of 4,000. That is, in the case of Example 2 including the compounds of various molecular weights, even if the number of the erasing operations increased, the water-repellent angle was maintained at a significantly and unexpectedly high level, thereby providing having an excellent anti-fingerprint characteristic. Example 3 of Table 1 was the result of an experiment made by increasing the thickness of the anti-fingerprint layer 230 compared with Example 2. Example 3 increased the thickness of the anti-fingerprint layer 230 by 50% compared with that of Example 2. Referring to Table 1, it can be seen that when the thickness of the anti-fingerprint layer 230 is increased, the wear resistance and chemical resistance are improved.

Figure 9:
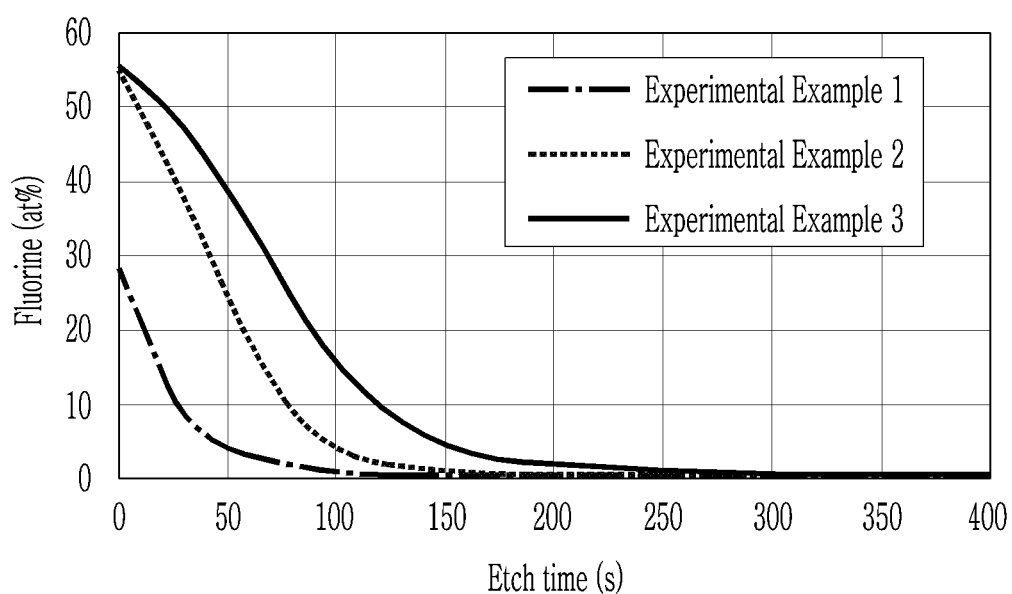
FIG. 9 is a graphical depiction of measurement results of fluorine concentration for a hard coating layer not including an anti-fingerprint layer (Experimental Example 1) and anti-fingerprint layers (Experimental Examples 2 and 3) made according to the principles of the invention.

FIG. 9 is a graphical depiction of measurement results of fluorine concentration for a hard coating layer not including an anti-fingerprint layer (Experimental Example 1) and anti-fingerprint layers (Experimental Examples 2 and 3) made according to the principles of the invention. Particularly, FIG. 9 illustrates a graph of measurement results of fluorine concentration in weight percent (wt %) for a hard coating layer not including an anti-fingerprint layer (Experimental Example 1) and embodied anti-fingerprint layers (Experimental Examples 2 and 3) over time in seconds (s). Referring to FIG. 9, when the anti-fingerprint layer having compounds made according to the principles and an embodiment of the invention were included, the fluorine content was higher, and that the anti-fingerprint layer had an excellent anti-fingerprint characteristic.

Process for Manufacture

Hereinafter, an illustrative manufacturing method of the display device according to an embodiment of the invention will be described, focusing on manufacturing of the coating layer. In the manufacturing method of the coating layer according to some embodiments, the anti-fingerprint layer may be formed by a roll-to-roll process.

Figure 10:
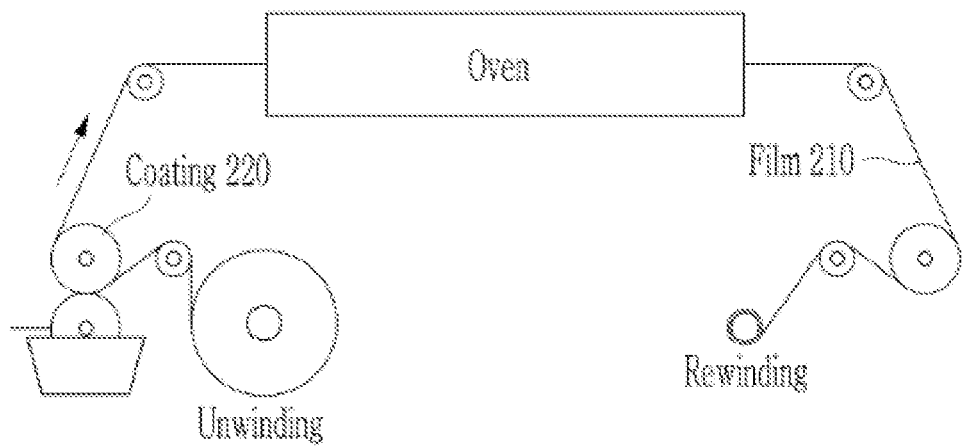
FIG. 10 is a schematic view of an embodiment of a roll-to-roll process for forming an anti-fingerprint layer according to the principles of the invention.

FIG. 10 is a schematic view of an embodiment of a roll-to-roll process for forming an anti-fingerprint layer according to the principles of the invention. First, as shown in FIG. 5, the hard coating layer 220 is formed on the base film 210. In this case, the hard coating layer 220 may be formed by applying and curing a hard coating material at an upper portion of the base film 210.

Next, the base film on which the hard coating layer 220 is formed is coated with a solution including the coating composition according to some embodiments. As described above, the coating composition may include the compound represented by Chemical Formula 1, and it may be a mixture of compounds having different molecular weights.

After the coating composition is coated, it is baked in an oven. In this process, the anchoring group of the compound included in the coating composition may be chemically bonded to a surface of the hard coating layer 220. That is, as shown in FIG. 5, the compound of Chemical Formula 1 may be bonded to the reaction group on the surface of the hard coating layer 220. Then, the process may be completed by rewinding the film on which the anti-fingerprint layer 230 is formed on the hard coating layer 220.

In the case of manufacturing the anti-fingerprint layer by the roll-to-roll method, the yield loss is minimized, so that mass production may be maximized, and the delamination phenomenon of the hard coating layer 220 and the anti-fingerprint layer 230 may be reduced or prevented. That is, when the anti-fingerprint layer 230 is manufactured by a conventional dry process, the anti-fingerprint layer 230 peels off, or it peels off during use. However, in the case of the manufacturing method according to the principle and embodiments of the invention, because the surface of the hard coating layer 220 and the compound included in the anti-fingerprint layer 230 are chemically bonded through the roll-to-roll process, it is not easily peeled off, and thus reliability may be improved.

As described above, a coating composition made according to the principles and embodiments of the invention and a coating layer manufactured with this composition include the compound represented by Chemical Formula 1, which include compounds having different molecular weights. Therefore, it is possible to improve the anti-fingerprint characteristics and the wear resistance of the display device. Moreover, because a plurality of anchoring groups of the compound of Chemical Formula 1 are bonded to the hard coating layer, the anti-fingerprint layer is not easily peeled off, or it is not peeled off, thereby increasing reliability.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A coating composition including compounds of Chemical Formula 1:

Chemical Formula 1 wherein A is an oligomer group comprising carbon and fluorine;

B is —$(CH_2)_x$-, wherein x is an integer of 0 to 12;

D is carbon or silicon;

each of E1 to E3 is, independently from one another, H, —X1-[$(CH_2)_y$-X2]z, or —$(CH_2)_y$-X3, wherein at least one of E1 to E3 is not H;

y is an integer of 0 to 8;

z is an integer of 1 to 3;

X1 is oxygen, nitrogen, sulfur, carbon, or phosphorus; and each of X2 and X3, independently from one another, includes a hydroxy group, a dimethyl monoalkoxysilane group, a monomethyldialkoxysilane group, a trialkoxysilane group, a silazane group, an amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, or an isocyanate group, wherein the compounds of Chemical Formula 1 comprise:

a first compound with a molecular weight of the group A of about 270 to about 930 in Chemical Formula 1, a second compound with a molecular weight of the group A of about 1,800 to about 2,200 in Chemical Formula 1, and a third compound with a molecular weight of the group A of about 3,600 to about 4,400 in Chemical Formula 1.

2. The coating composition of claim 1, wherein weight ratios of the first, second, and third compounds of the coating composition are:

the first compound to the second compound is about 0.9:1 to about 1.1:1;

the second compound to the third compound is about 0.9:1 to about 1.1:1; and the third compound to the first compound is about 0.9:1 to about 1.1:1.

3. The coating composition of claim 1, wherein the first, second, and third compounds are compounds of Chemical Formula 6:

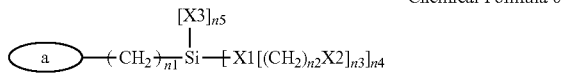

Chemical Formula 6 wherein a is a perfluoropolyether group;
n1 is an integer of 0 to 12;

n2 is an integer of 1 to 8;
n3 is an integer of 1 to 3;
each of n4 and n5 is, independently from one another, an integer of 0 to 3 with the proviso that n4+n5=3;
the X1 is oxygen, nitrogen, sulfur, carbon, or phosphorus; and
each of X2 and X3, independently from one another, is a hydroxy group, a dimethyl monoalkoxysilane group, a monomethyldialkoxysilane group, a trialkoxysilane group, a silazane group, a primary amine group, a secondary amine group, a tertiary amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, or an isocyanate group.

4. A coating composition including a compound of Chemical Formula 1:

Chemical Formula 1 wherein A is an oligomer group comprising carbon and fluorine;
B is —(CH$_2$)x-, wherein x is an integer of 0 to 12;
D is carbon or silicon;
each of E1 to E3 is, independently from one another, H, —X1-[(CH$_2$)y-X2]z, or —(CH$_2$)y-X3, wherein at least one of E1 to E3 is not H;
y is an integer of 0 to 8;
z is an integer of 1 to 3;
X1 is oxygen, nitrogen, sulfur, carbon, or phosphorus; and
each of X2 and X3, independently from one another, includes a hydroxy group, a dimethyl monoalkoxysilane group, a monomethyldialkoxysilane group, a trialkoxysilane group, a silazane group, an amine group, an ethylene glycol group, a triethylene glycol group, a mercapto group, an ester group, an alkoxy group, a methacrylic group, an acrylic group, a carboxylic acid group, a cyclic amine group, an epoxy group, a fluorocarbon group, an azide group, a benzophenone group, or an isocyanate group,
wherein the group A includes a group of Chemical Formula 3:

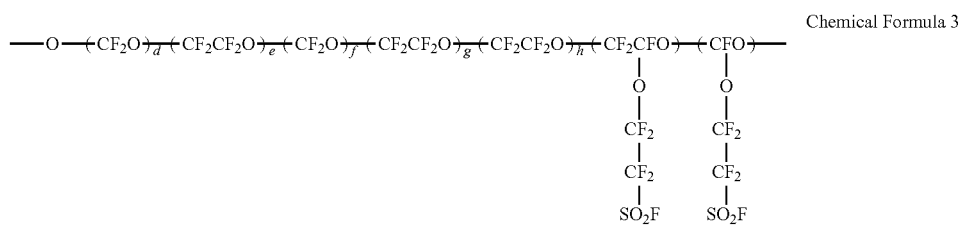

Chemical Formula 3 wherein in Chemical Formula 3, each of d, e, f, g, and h is, independently from one another, an integer of 0 to 50.

5. A coating composition including a compound of Chemical Formula 1:

Chemical Formula 1 wherein A is an oligomer group comprising carbon and fluorine;
B is —(CH$_2$)x-, wherein x is an integer of 0 to 12;
D is carbon or silicon;
each of E1 to E3 is, independently from one another, H, —X1-[(CH$_2$)y-X2]z, or —(CH$_2$)y-X3, wherein at least one of E1 to E3 is not H;
y is an integer of 0 to 8;
z is an integer of 1 to 3; and
X1 is oxygen, nitrogen, sulfur, carbon, or phosphorus, and
wherein each of X2 and X3 is a group, independently from one another, of Chemical Formula 4 or Chemical Formula 5:

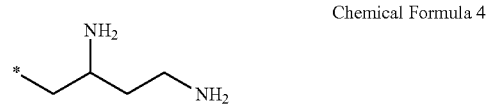

Chemical Formula 4

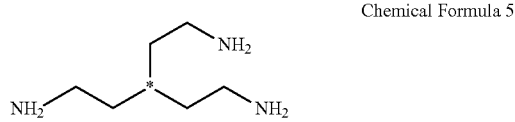

Chemical Formula 5 wherein * represents one bond to an adjacent atom.

* * * * *